N. D. Hinman,

Hay Elevator.

No. 2,751. Reissued Aug. 20, 1867.

Witnesses:

Henry Morris
C. L. McTofelff

Inventor:

N. D. Hinman
per Munn & Co
attorneys

AM. PHOTO-LITHO. CO. N.Y. (OSBORNE'S PROCESS)

United States Patent Office.

N. D. HINMAN, OF STEPNEY DEPOT, CONNECTICUT.

*Letters Patent No.* 45,245, *dated November* 29, 1864; *reissue No.* 2,751, *dated August* 20, 1867.

IMPROVEMENT IN ELEVATORS.

The Schedule referred to in these Letters Patent and making part of the same.

TO ALL WHOM IT MAY CONCERN:

Be it known that I, N. D. HINMAN, of Stepney Depot, in the county of Fairfield, and State of Connecticut, have invented a new Improvement in Elevators; and I do hereby declare the following, when taken in connection with the accompanying drawings and the letters of reference marked thereon, to be a full, clear, and exact description of the same, and which said drawings constitute part of this specification, and represent, in—

Figure 1:
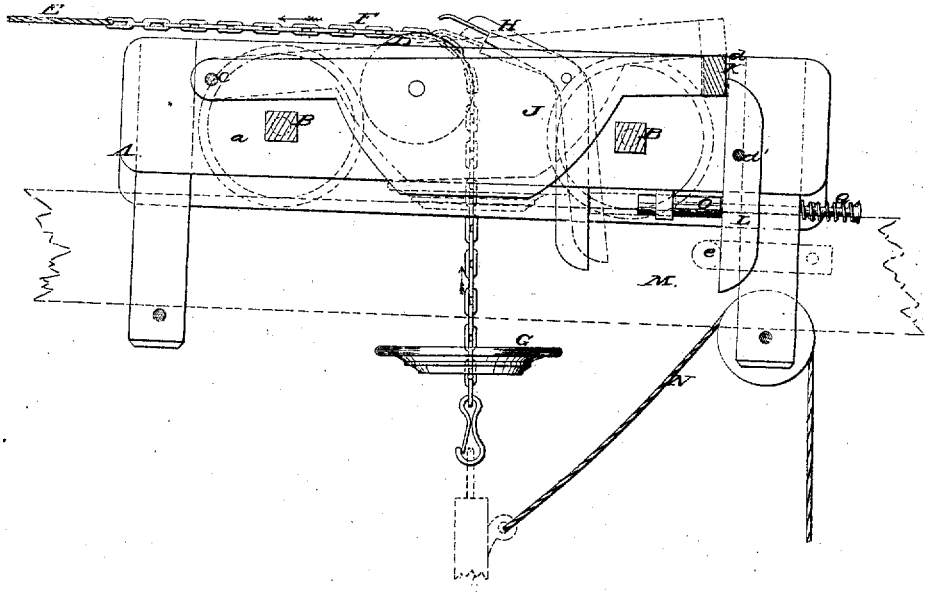
Figure 2:
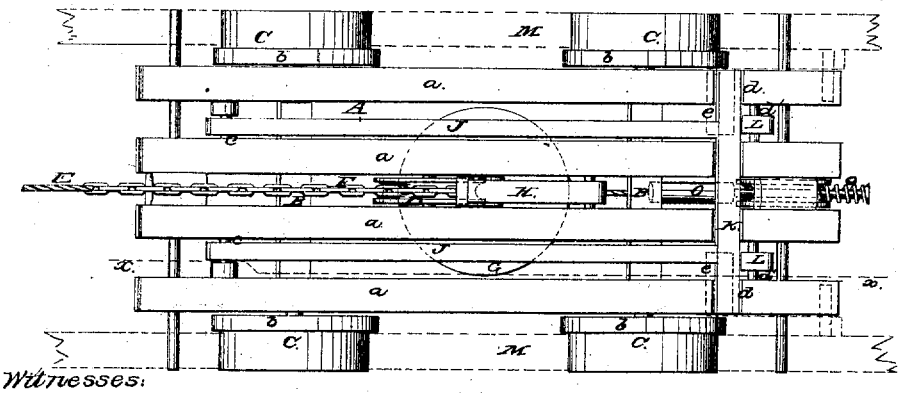

Figure 1, a side sectional view of my invention, taken in the line *x x*, fig. 2.

Figure 2, a plan or top view of the same.

This invention relates to a new and useful improvement in that class of elevators which are connected with a car placed on elevated ways, and arranged in such a manner that the load when elevated may be drawn over the spot where it is desired to have it deposited and then dumped.

This invention is chiefly designed for elevating and moving hay and grain in barns, but is applicable to other purposes.

This invention consists in a novel construction and arrangement of parts pertaining to the car, whereby the same is held stationary when the load is being elevated, and liberated automatically, and allowed when the load is elevated to travel on the ways over the spot where the load is to be dumped, the car being allowed to move back to its original position by its own gravity, the ways being inclined to admit of that result.

In order to the clear understanding of my invention, as well as to enable others to construct the same, I will proceed to a description thereof, as illustrated in the accompanying drawings.

A represents the car, composed of four parallel bars, *a*, fitted or secured at equal distances apart on two axles, B B, on the outer ends of which wheels, C, provided with flanges *b* are fitted loosely. Between the two centre bars *a a* there is a fixed pulley, D, over which the hoisting-rope E passes, said rope being connected to the fork, bucket, or other article which holds or contains the load to be elevated, by means of a chain, F, which also passes over the pulley D, said chain having a button, G, on its lower end, the use of which will be presently shown. H is a pawl, which at certain times catches into the chain F and prevents its descent over the pulley D. This pawl is fitted between the two central bars *a a* of the car, and is of right-angular or bent form, and its lower end is directly opposite a sliding-rod, O, in the car, said rod extending through one end of the car, and having a spiral spring, Q, upon it, which has a tendency to keep the inner end of the rod free from the lower end of the pawl, as will be understood by referring to both figures. It will be observed that while the pawl H is represented as being operated by the sliding-rod O, it is not essential that the sliding-rod O be so arranged that the arm of the pawl may strike against any fixed point on its return, to be raised instead of the sliding-rod O, and in such case the rod O with its spring may be dispensed with, it only being essential that the pawl be automatically tripped from the chain or rope when returned to its place of descent. J J are two parallel bars or plates, which are fitted at one end on pivots, C, between the outer and central bars *a* of the car A. The opposite ends of these bars J J are connected by a cross-piece, K, which, when the bars J J are fully down, rests in notches *d d* in the upper edges of the bars *a*, so that the upper surfaces of K, J J, and *a* will be "flush" with each other, or in one and the same plane. L L are two bars, which are fitted on pivots *d'* between the outer and central bars *a* of the car. These bars L L project down below the car A, and their upper ends bear against the cross-piece K when the car is held in position for the load to be elevated. The bars L L operate as stops, and prevent the car A from moving on its ways M when the load is being elevated, said bars bearing against pins *e* attached to the ways, (see fig. 1.) When the car is at this point it will be seen that the bars L L, in consequence of being in contact with the pins *e*, will hold it while the rope and chain E F are drawn up over the pulley D in the direction indicated by the arrow in fig. 1. When the load is fully elevated the button G comes in contact with the lower surfaces of the bars J J and raises them, causing the cross-piece K to be thrown above the upper parts of the bars L L, so that the latter will be free to turn on their pivots *d* and admit of the car A under the pull of the hoisting-rope E to be drawn along on the ways M. When the car reaches the point on the ways where the load is to be dumped it is arrested by any suitable stop, and the operator, by means of a rope, N, trips the fork or turns the bucket so as to dump the load. During the time the car is being drawn upon the ways M the pawl H is in contact with the chain F, and prevents the load descending in case of any checking of the horse or cessation of pull on the rope E. This pawl is kept engaged with the chain F by its own gravity only. When the load has been dumped, the horse by which the load was elevated is backed, and the car A is allowed to move back on the ways M to its original position, the ways being somewhat inclined to admit of this result. As the car reaches its original position the rod O comes in contact with a stop, and is thereby pressed or forced inward, so as to strike the lower end of the pawl H and cause the upper end of the same to rise free from the chain F to admit of the empty fork or bucket descending to be again filled or reloaded for a succeeding ascent, the bars L L passing behind the pins *e* so as to hold the car, when the load is again hoisted, and when the fork or bucket is again raised and the button G comes in contact with the bars J J, and the latter are raised to liberate the car and admit of its being drawn on the ways with its suspended load, the pawl H will drop by its own gravity and engage with the chain F, the rod O being forced back or outward from the lower end of the pawl by the spring Q. The pawl H, it will be understood, is always in contact with the chain F, except when the empty fork or bucket descends to be reloaded. I would remark that the hoisting-rope E is arranged over pulleys, and has the horse attached to it in the same way as all similar elevating devices. By this arrangement I dispense with a weight and pulley to draw back the car after the load has been dumped, and the device is much more simple than those hitherto constructed to effect the same result, and works much smoother and easier, with less tear and wear, and without any sudden jerks which attend the use of the cars which are provided with weights.

Having therefore thus fully described my invention, what I claim as new and useful, and desire to secure by Letters Patent, is—

The bars J J, L L, pivoted in the car A, as shown, and the bars J J, connected at one end by a cross-piece, K, in combination with the button G on the chain F, and the pins *e* on the inclined ways M, all arranged substantially as and for the purpose herein set forth.

I further claim the bent pawl H, arranged to operate in connection with the chain F and pulley D, substantially as and for the purpose set forth.

N. D. HINMAN.

Witnesses:

JOHN E. EARLE,

A. J. TIBBITS.